(No Model.)
H. LINDESTROM.
WHEELED PLOW.
No. 536,574. Patented Mar. 26, 1895.
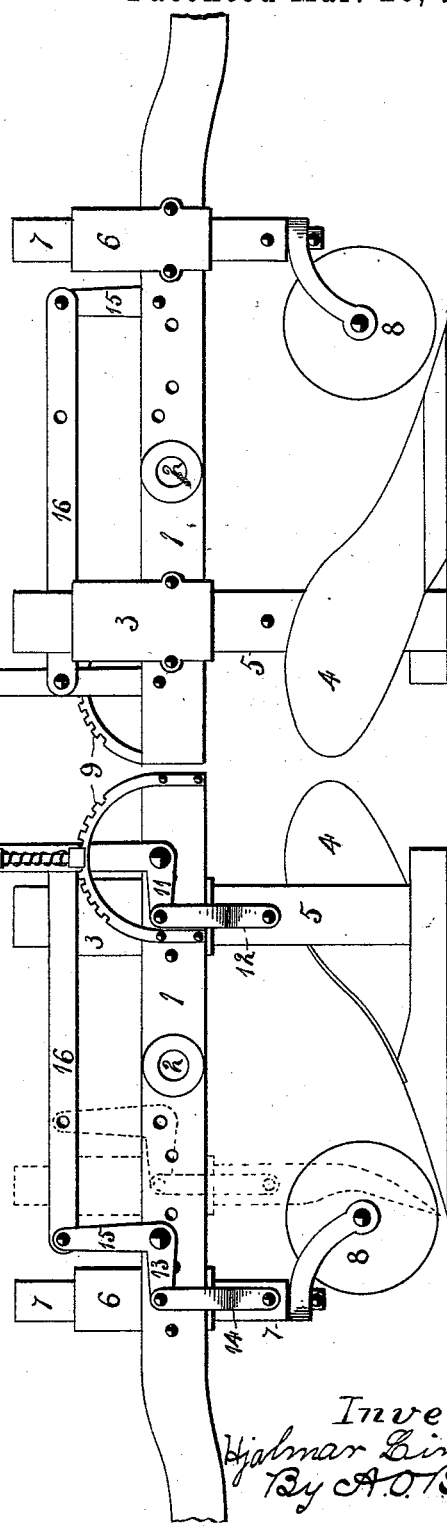
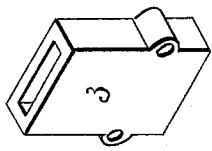
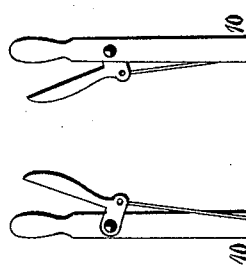
Witnesses:
O. P. Jackson
E. Behel
Inventor.
Hjalmar Lindestrom
By A. O. Behel
Atty.

UNITED STATES PATENT OFFICE.

HJALMAR LINDESTROM, OF CHICAGO, ILLINOIS, ASSIGNOR OF ONE-HALF TO NELS P. WALTER AND ANDREW WALTER, OF SAME PLACE.

WHEELED PLOW.

SPECIFICATION forming part of Letters Patent No. 536,574, dated March 26, 1895.

Application filed August 20, 1894. Serial No. 520,861. (No model.)

*To all whom it may concern:*

Be it known that I, HJALMAR LINDESTROM, a citizen of the United States, residing at Chicago, in the county of Cook and State of Illinois, have invented certain new and useful Improvements in Wheeled Plows, of which the following is a specification.

The object of this invention is to construct a plow in which the plow and colter have a bodily vertical movement in unison, and operated by a single hand lever.

In the accompanying drawings, Figure 1, is a left hand side elevation of a plow beam to which are attached my improvements. Fig. 2, is a right hand side elevation to that shown at Fig. 1. Fig. 3, is an isometrical representation of the guide for the plow standard.

The plow beam 1, is intended to be supported in any suitable frame, but in this instance the forward end has a limited vertical movement, the beam being supported upon an axle passing through the opening 2. To one side of this beam is connected a guide way 3, for the plow standard which is of rectangular form and is located in a vertical position. To the plow 4, is connected a standard 5, of a form to fit its guide way. To the same side of the plow beam is adjustably connected a guide 6, for the colter shank, which is also of rectangular form, and the colter shank 7, fits the guide way, and to the lower end of the shank is connected a disk colter 8, in any suitable manner.

To the rear portion of the plow beam is connected a toothed segment 9, and a hand lever 10, provided with the usual thumb lever has a pivotal connection with the beam. The lower end 11, of this hand lever is bent at right angles to the length of the main portion having its end perforated. A link 12, has a pivotal connection with the lower end of the hand lever at one end, its other end having a pivotal connection with the plow standard below the plow beam.

To the plow beam in advance of the hand lever is pivoted a bell-crank lever, the horizontal arm 13, having a connection with the colter shank 7, through the link 14, the connection with the shank being below the plow beam.

The vertical arm 15, of the bell-crank lever has a connection with the hand lever through the medium of the link 16.

The plow beam being supported upon the axle, the plow may be raised or lowered by its link connection with the hand lever, the plow standard being guided in its vertical movement by the guide 3, and the link connection between the hand lever and colter shank will raise and lower the colter in unison with the movements of the plow, so that the colter will hold a fixed relation with the plow at all times.

In stony soil a fixed or knife colter is employed as shown in dotted lines, the position of the shank guide and bell-crank lever being shifted into the position shown in dotted lines at Fig. 1, holes being provided for that purpose in the plow beam also in the link 16.

I claim as my invention—

In a wheeled plow, the combination of a plow beam, a plow having a vertical standard, a vertical guide way for the standard secured to the plow beam, a hand lever having a pivotal connection with the beam and a link connection with the standard, a vertical colter guide secured to the beam, a vertical colter shank located in the guide, a bell-crank lever having a pivotal connection with the beam and a link connection with the shank and a link connection with the hand lever.

HJALMAR LINDESTROM.

Witnesses:
JAMES S. JACKSON,
ANDREW WALTER.